United States Patent
Walter et al.

(10) Patent No.: US 7,988,942 B2
(45) Date of Patent: Aug. 2, 2011

(54) METHOD AND SYSTEM FOR CONCENTRATING WASTE SULPHURIC ACIDS FROM NITRATION PROCESSES

(75) Inventors: Ulrich Walter, Idstein (DE); Gottfried Dichtl, Nieder-Olm (DE)

(73) Assignee: DE Dietrich Process Systems GmbH, Mainz (DE)

( * ) Notice: Subject to any disclaimer, the term of this patent is extended or adjusted under 35 U.S.C. 154(b) by 194 days.

(21) Appl. No.: 12/305,902

(22) PCT Filed: Jun. 20, 2007

(86) PCT No.: PCT/EP2007/005446
§ 371 (c)(1),
(2), (4) Date: Dec. 19, 2008

(87) PCT Pub. No.: WO2007/147585
PCT Pub. Date: Dec. 27, 2007

(65) Prior Publication Data
US 2010/0233069 A1    Sep. 16, 2010

(30) Foreign Application Priority Data

Jun. 21, 2006 (EP) .................................... 06012758

(51) Int. Cl.
*B01J 19/00* (2006.01)
*C01B 17/69* (2006.01)
*C01B 21/46* (2006.01)
(52) U.S. Cl. ........ 423/522; 423/523; 423/525; 422/129; 422/160; 422/161; 422/187
(58) Field of Classification Search .................. 423/522, 423/523, 525; 422/129, 160, 161, 187
See application file for complete search history.

(56) References Cited

U.S. PATENT DOCUMENTS
5,030,436 A * 7/1991 Steadman et al. ............ 423/523
(Continued)

FOREIGN PATENT DOCUMENTS
DE      196 36 191 A1     2/1998
(Continued)

OTHER PUBLICATIONS

Helmold von Plessen et al.: "Entwicklung des Pauling-Verfahrens zur Regeneration von Abfallschwefelsäure", in: Chem.-Ing.-Tech. 59, 1987, No. 6, pp. 470-475.

*Primary Examiner* — Timothy C Vanoy
(74) *Attorney, Agent, or Firm* — Henry M. Feiereisen; Ursula B. Day

(57) ABSTRACT

A method for recovering diluted waste sulfuric acid by extractive rectification with concentrated sulfuric acid which is re-concentrated for reutilization. Waste sulfuric acid from the nitration process is fed into a first column, optionally together with another waste sulfuric acid in a DNT washing acid, and divided into an overhead product containing nitric acid and nitro-organic compounds and a prepurified sulfuric acid in the bottom product. The prepurified sulfuric acid withdrawn from the bottom of the first column is fed to the top of a second column, into the bottom zone of which another waste sulfuric acid is fed in the form of a diluted sulfuric acid recovered from the nitric acid concentration system so the prepurified sulfuric acid from the first column is further purified in the second column and is preconcentrated along with the diluted sulfuric acid recovered from the extractive rectification of nitric acid.

19 Claims, 2 Drawing Sheets

U.S. PATENT DOCUMENTS

| | | |
|---|---|---|
| 5,275,701 A | 1/1994 | Mazzafro et al. |
| 6,156,288 A | 12/2000 | Beckhaus et al. |
| 6,969,446 B1 | 11/2005 | Dichtl et al. |
| 2010/0145109 A1* | 6/2010 | Marion .................. 568/934 |

FOREIGN PATENT DOCUMENTS

| | | |
|---|---|---|
| EP | 0 155 586 A1 | 9/1985 |
| EP | 1 284 928 B1 | 5/2005 |

* cited by examiner

METHOD AND SYSTEM FOR CONCENTRATING WASTE SULPHURIC ACIDS FROM NITRATION PROCESSES

CROSS-REFERENCES TO RELATED APPLICATIONS

This application is the national phase of prior filed copending PCT International application no. PCT/EP2007/005446, filed Jun. 20, 2007, which designated the United States and on which priority is claimed under 35 U.S.C. §119 (a)-(d), the disclosure of which is hereby incorporated by reference.

This application claims the priority of European Patent Application, EP 06012758.6, filed Jun. 21, 2006 pursuant to 35 U.S.C. 119(e), the disclosure of which is incorporated herein by reference.

BACKGROUND OF THE INVENTION

The present invention relates to a method and a system for purifying and concentrating spent and diluted sulphuric acid from nitration processes, in which nitric acid is used as a nitrating medium in the presence of sulphuric acid. Such a diluted sulphuric acid is referred to below as a rule as "waste acid from the nitration process".

Nitration processes play a key role in the chemical industry for the production of nitro compounds and are carried out on an industrial scale. In most cases, the nitro compounds produced serve as valuable intermediates owing to the numerous potential reactions of a nitro group and the secondary products which can be produced therefrom.

Particularly important is the nitration of aromatic compounds, for example of toluene, with production of nitro aromatics, in particular of dinitrotoluene (2,4-dinitrotoluene; DNT), since aromatic nitro groups can be converted by reduction in a simple manner into amino groups, which in turn can be subjected to numerous further reactions. A particularly important further processing, for example of DNT, is that to give toluene diisocyanate (TDI) after an initial reduction of DNT to toluenediamines and a subsequent reaction thereof with phosgene, or by direct reaction of the DNT with CO. TDI is one of the most important aromatic diisocyanates for the production of polyurethanes.

The introduction of one or more nitro groups into an aromatic compound, such as, for example, toluene, is effected as electrophilic substitution with the aid of nitric acid mixed with sulphuric acid, for example in one stage with nitrating acid (this term refers to mixtures of concentrated sulphuric and nitric acid of different compositions) or, in the case of a dinitration, as in the production of DNT, optionally also in two stages with acids of different strengths, in a typical two-stage process toluene being nitrated to give mononitrotoluene (MNT) in the first stage, with the use of a less concentrated optionally worked-up waste acid from the second stage, and a further nitro group being introduced into this MNT in the second stage with the use of a highly concentrated nitric acid with formation of DNT (cf. for example EP 155 586 A1).

While the nitric acid fraction of the nitrating acid is consumed to a very high proportion during the introduction of the nitro groups as substituents on the aromatic ring, the simultaneously present concentrated sulphuric acid is only diluted and contaminated by the resulting water of reaction. It forms the "waste acid from the nitration process" mentioned at the outset, which typically comprises mainly a more than 70% by mass sulphuric acid and water, and smaller proportions of nitric acid, nitro-organic compounds, for example mononitrotoluene (MNT) and dinitrotoluene (DNT), and nitrous constituents in the form of, for example, nitrosylsulphuric (abbreviated below to NSS).

It is then an urgent requirement of modern economic process management to work up this waste acid from the nitration process and to convert it into a concentrated sulphuric acid which can be reused in the process. Use of fresh sulphuric acid for the nitration process has long been unacceptable for economic and environmentally relevant reasons.

Reconcentration of the stream of waste acid from the nitration process to sulphuric acid concentrations between 89% by mass and 94% by mass is therefore regularly carried out today, and it must be an aim to achieve such reconcentration with as little energy input as possible and the formation of as small amounts as possible of waste streams which are contaminated with chemicals and have to be discharged from the process.

A high degree of concentration of sulphuric acid to max. 96% by mass sulphuric acid content, which is expediently effected under reduced pressure conditions in the final stages because of thermodynamic requirements in the process, has for decades been part of the prior art with the development of highly corrosion-resistant materials suitable for this purpose, such as tantalum, enamel and glass, for the evaporation at high temperatures. However, the fact that the preferred evaporator material tantalum can be used only at a maximum boiling point of less than 208° C. of the waste acid from the nitration process which is to be concentrated is to be regarded as a limitation.

An early method for concentrating spent dilute sulphuric acid to give relatively pure acid of about 96% by mass was the so-called Pauling method [Bodenbrenner, Von Plessen, Vollmüler, Dechema-Monogr. 86 (1980), 197]. However, this method was energy-intensive and had, as a further disadvantage, a high level of formation of $SO_2$ and NOx compounds, owing to a strong oxidative decomposition of the organic compounds present in the waste acid from the nitration process at the required high temperatures.

The particular problem in the concentration of waste acids from nitration processes lies in the foreign constituents, originating from the nitration, in the acid, in particular in the form of compounds containing nitrogen-oxygen groups, such as nitric acid, various organic compounds, mainly MNT and DNT, and the dissolved nitrous constituents in the form of nitrosylsulphuric acid (NSS), the content of which is as a rule stated as the content of nitrous acid ($HNO_2$).

Since, by virtue of their character, said substances are either potential feedstocks or incompletely isolated products or intermediates, it is of course desirable to be able to recycle them very substantially, as in the case of the sulphuric acid, to the nitration process and to keep the losses of these feedstocks, intermediates and end products as small as possible. The methods of the prior art were however still suboptimal in this respect, in particular if it is considered that such potentially useful products can also be found in other product streams of a process for the nitration of aromatic compounds, for example in the wash water of the end product of the toluene nitration process which is isolated in crystalline form, the DNT, which streams have to date been discharged as waste streams from the nitration process and worked up separately. A DNT wash water of said type is acid-containing, and is therefore also referred to as wash acid, and may contain, for example, a typical composition of 10-20% by mass of $HNO_3$, 5-12% by mass of $H_2SO_4$ (18-35% by mass of total acid) and dissolved nitro-organic compounds (DNT, MNT). The term "mixed acid" is also used for this wash acid.

The presence of said nitrogen-oxygen compounds, in particular of the nitro-organic compounds, in the waste acid from the nitration process means that the recovery and concentration of the sulphuric acid fraction present therein is associated with particular technical difficulties. Thus, the proportions of the nitrated aromatics, which are sparingly volatile solids which have a low solubility in aqueous media and may be precipitated from these, may be deposited on parts of the plant, block them and thus interfere with the overall method. The proportions of nitric acid and nitroso compounds on the other hand are relatively volatile and can pass over into evaporation streams, from which however they are difficult to recover and may constitute an environmental risk.

Regarding the individual troublesome ingredients of a waste acid from the nitration process, the problems which they give rise to in the concentration of the waste acid from the nitration process with recovery of the concentrated sulphuric acid are described below, known methods of the prior art for solving the specific problems associated with these ingredients being discussed at the same time:

a. Nitric Acid

In the individual evaporation stages of the working-up of waste acid from the nitration process for sulphuric acid concentration, the nitric acid present in the feed is finally virtually completely evaporated from the concentrated sulphuric acid, owing to its comparatively high volatility, therefore mainly enters the vapour condensate and, if no special measures are taken, inevitably enters the waste water to be discharged. In the case of some waste acids from the nitration process, the content of $HNO_3$ in the feed may easily be 1-2% by mass according to the nitration process, in particular when the nitration is carried out with highly concentrated nitric acid of about 98% by mass—99% by mass instead of with azeotropic nitric acid.

Such high proportions of $HNO_3$ in the waste acid from the nitration process would lead not only to the loss of this nitric acid but also excessively high pollution of the waste water with nitrate. The latter is no longer acceptable today for environmental protection reasons.

In the past, as a rule the waste acid from the nitration process was therefore fed in a pre-concentration stage to the upper part of a stripping column operated with steam by the countercurrent method, in order virtually completely to eliminate the nitric acid from the sulphuric acid. A further desired effect of this pre-concentration by means of a stripping column consisted in being able simultaneously also to remove a part of the other interfering products in the waste acid from the nitration process by stripping, such as, for example, a part of the nitro-organic compound load. The energy for such a pre-concentration stage, which is predominantly operated under atmospheric pressure, was supplied either indirectly by a separate heater or by direct steam introduced into the stripping column, depending on the method.

A very aqueous DNT/MNT- and $HNO_3$-containing heterogeneous solution was inevitably obtained as a top product of the pre-concentration stage, after the total condensation thereof, from which solution the insoluble organic constituents precipitated as solids had first to be separated off by gravitational force (allowing to settle, centrifuging). In order to recover the nitric acid present in the liquid phase obtained, an additional subazeotropic rectification stage, which generally operated in the same way as the pre-concentration stage at atmospheric pressure, was integrated into the working-up method in order to obtain an about 45-50% nitric acid in the bottom product of such rectification. This can be used in many nitration processes without further higher concentration, as can the organic compounds separated off (mainly DNT), by recycling directly into the nitration.

A relatively acid-free waste water which was suitable for being used at least partly as wash water for the DNT washing could be obtained as a top product of the nitric acid rectification.

That step of a special nitric acid recovery method which is integrated into the working-up of the waste acid from the nitration process is known by the technical term "nitric acid pre-concentration", abbreviated by the letters "NAPC".

A substantial disadvantage of this NAPC stage is that, as a result of the rectification, the water to be discharged from the stripping column evaporates a second time and has to be condensed. Moreover, there is the danger that at vapour condensate temperatures below 55° C., the unprecipitated DNT will settle as a solid in parts of the system and will thus lead to considerable difficulties.

The NAPC stage is used in known methods even when the abovementioned acid-containing wash water from the DNT washing, which is a sulphuric acid/nitric acid mixture comprising 18-35% by mass, generally 20-30% by mass, of total acid has to be worked up. Since, in such an acid-containing wash water to be worked up, nitrous constituents and DNT are likewise present in the feed, this wash acid is comparable with the vapour condensate of the pre-concentration stage and has similar problems.

Nitrosylsulphuric acid $NHOSO_4$ ($HNO_2$)

The nitrosylsulphuric acid (NSS), which scarcely exists in dilute aqueous sulphuric acids but is very stable in highly concentrated sulphuric acids of more than 82% by mass, is formed in the nitration process and may be present in amounts up to more than 5% by mass in the waste acid from the nitration process, which acid is to be concentrated. It embodies the potential of the nitrous constituents present in the waste acid from the nitration process, the content of which constituents is stated as nitrous acid $HNO_2$.

The reason is that the analytical determination of the NSS in the waste acid from the nitration process is usually effected in very dilute solution, according to the following equation, as $HNO_2$:

a.

In the case of the thermal concentration of sufficiently water-containing waste acid from the nitration process, the NSS present therein is to a great extent decomposed according to the following equation:

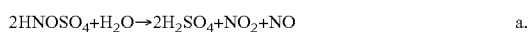

a.

If the resulting nitrogen-dioxide reaches the condenser region, for example of the pre-concentration stage, by stripping, a considerable amount of fresh very dilute nitric acid is very rapidly formed therefrom and has to be worked up together with a large proportion of water in the NAPC step.

The NO gas present in the waste acid from the nitration process and newly formed according to the abovementioned equation is insoluble and, owing to the lack of oxygen in the system, passes unchanged through the condensers. As is in any case usual in the industrial processes today, this NO-containing gas is fed to a further working-up stage for purification and recovery, for example to an NO absorption stage for the production of further subazeotropic nitric acid.

In spite of the difficulties which the oxides of nitrogen in the top product of the stripping column present for the pre-concentration of the sulphuric acid, the decomposition of the NSS($HNO_2$) in this concentration stage is desired since the NSS no longer decomposes above the abovementioned limit of 82% by mass of sulphuric acid in the further concentration in which the sulphuric acid contents increase further. If the NSS were not decomposed in the pre-concentration stage, it would be circulated with the concentrated sulphuric acid, and its content would increase unnecessarily during the method with progressive nitration and concentration of the waste acid from the nitration process.

A pre-concentration stage according to the prior art to date, as was described herein, does not however optimally perform the function of the decomposition of the NSS.

Nitro-Organic Compounds, Mainly DNT

Most problems in the concentration of the aqueous feed acid (i.e. the waste acid from the nitration process) are presented by the nitro-organic compounds dissolved in said acid, chiefly the DNT. Owing to the limited miscibility of the nitro-organic compounds in the aqueous feed acid, MNT and DNT are steam-volatile and, in spite of the high boiling points of the pure substances, can in principle be stripped out from the acid by steam. However, in the case of DNT, the highest-boiling compound of the nitro-organic compounds, stripping with stripping steam in the customary pre-concentration stage of the prior art takes place only to an insufficient extent.

The fact that considerable amounts of DNT were still present in the waste acid from the nitration process even after its pre-concentration had the result in the known methods that, in the following stages for the concentration of the waste acid from the nitration process with reduced-pressure operation at about 100 mbar abs or below, further DNT entered the vapour condensate of these reduced-pressure stages, owing to the thermodynamically improved conditions for the volatilization of the DNT. Since the vapours of the reduced-pressure stages have to be condensed at relatively low temperatures of <45° C. owing to the reduced pressure in the system, the undissolved DNT is precipitated as a solid from the vapour condensates and presents considerable problems for the continuous sulphuric acid concentration process.

In order to avoid the problems which are caused at reduced pressure by the DNT precipitation in the condensates of the vapours of the concentration of waste acid from the nitration process, EP-A 0 155 586 A1 proposed, in a two-stage process for DNT production, in which the dilute waste acid from the initial process stage of mononitration is fed directly to a reduced-pressure concentration stage, additionally spraying a defined amount of MNT into the condensers at selected points in order to reduce the setting point of the DNT fraction and to prevent the DNT crystallisation. This spraying with MNT is complicated and introduces MNT into the process streams at those points of the concentration process where it can have a thoroughly troublesome effect. It is to be regarded as particularly disadvantageous that the total waste water which is produced during the concentration of the waste acid from the nitration process and from the additional foreign steam which may be used for process engineering reasons is additionally contaminated with organic compounds in such a procedure.

To take this deficiency into account, DE 196 36 191 A1 proposed, in the working-up of the waste acid from the nitration process, introducing a stage for the purification of the waste acid by stripping with as much steam as possible upstream of the reduced-pressure concentration, in order to ensure that the nitro-organic compounds, in particular the poorly strippable DNT having a high setting point, are virtually completely eliminated from the outflowing waste sulphuric acid in this stage (residual content <20 ppm), so that, in the subsequent concentration stages at 100 mbar (a) or below, problems due to the DNT precipitates described can no longer occur in the aqueous condensates of these stages.

A major deficiency of this solution is that it is not possible to produce the large amounts of steam required for the DNT stripping by self-evaporation from the waste acid from the nitration process which is used, even if the stripper and its evaporator are operated for this purpose under optimum reduced-pressure conditions under which the dew point or boiling point of the water is still above the temperature at which DNT begins to precipitate. Thus, the stripping of DNT with the desired effectiveness requires the use of a considerable amount of additional stripping steam, which causes the steam consumption of the overall method to increase greatly and moreover leaves a marked increase in the amount of waste water.

In the above discussion of the product streams of a system for the nitration of aromatics, for example for the nitration of toluene for the production of DNT, and for the working-up of the resulting waste acid from the nitration process, it was not taken into account that a highly concentrated nitric acid (75 to 99.9% strength, usually 98-99% strength) is also required in said systems for achieving the desired dinitration, in particular either for the production of a concentrated "nitrating acid" in the above sense or for the introduction of a second nitro group into the mononitrotoluene (MNT) produced in a first stage with the use of an approximately azeotropic nitric acid, in a two-stage procedure. This highly concentrated nitric acid is produced in a separate system which is coordinated with the actual system for carrying out the nitration and serves only for carrying out the process designated as NACSAC process ("nitric acid concentration sulphuric acid concentration") and intended for achieving a high degree of concentration of a dilute, usually azeotropic nitric acid and reconcentrating the extracting medium sulphuric acid.

In this system assigned to the actual nitration process, an optionally contaminated approximately azeotropic nitric acid obtainable as a feed stock and having a concentration in the range of 40 to 70% by mass, in particular of about 67% by mass, is concentrated by countercurrent extractive rectification. In the extractive rectification, as a rule a concentrated sulphuric acid having a concentration in the range of 86% by mass to 90% by mass is used for binding the proportions of water of the approximately azeotropic nitric acid, which concentrated sulphuric acid is diluted to about 70% by mass during the extractive rectification by uptake of the water from the nitric acid to be concentrated. In order to be able to recycle this dilute sulphuric acid to the extractive rectification, it must be reconcentrated. This reconcentration is usually effected in a particular part of the total NACSAC system for nitric acid concentration. The circulated sulphuric acid used in this system as an extracting medium is also referred to as "circulating acid" or "recycle acid" and is not part of the mass balance of the actual nitration process. Additional embodiments for achieving a high degree of concentration of nitric acid by extractive rectification using the extracting medium sulphuric acid and for reconcentrating the extracting medium are to be found in the patents EP 1 284 928 B1 and U.S. Pat. No. 6,969,446 B1 of the applicant.

SUMMARY OF THE INVENTION

It is an object of the present invention to improve a method and a system for the production of nitro aromatics in such a way that the use of direct steam is reduced, the amount of liquid waste streams derived from the method is reduced and the overall method is simplified and is therefore more economical and more environmentally friendly as a whole.

This object is achieved by a method, which includes recovering dilute and contaminated waste sulphuric acids from nitration processes, where the waste acid from the nitration process which is taken off from the nitration process and, in addition to up to 80% by mass of sulphuric acid and water, contains nitric acid ($HNO_3$), nitrosylsulphuric acid (as $HNO_2$) and nitro-organic compounds, in particular DNT and MNT, as further constituents being subjected to at least partial purification in a stripping column to remove said further constituents and then being fed to a further concentration stage in one or more downstream evaporators operating at reduced pressure, and the production of a highly concentrated nitric acid required in the nitration process from a more dilute nitric acid by extractive rectification with the use of concentrated sulphuric acid as an extracting medium also being coordinated with the nitration process, the sulphuric acid used as extracting medium being diluted during the extractive rectification and being reconcentrated for reuse, wherein the waste acid from the nitration process (F1) is fed to the top of a first, indirectly heated stripping column (K1) and is separated into a top product containing nitric acid and nitro-organic compounds and a prepurified sulphuric acid in the bottom product and the prepurified sulphuric acid taken off from the bottom of the first stripping column (K1) being fed to the top of a second further indirectly heated stripping column (K2) which is connected in series and into the bottom region or evaporator of which a dilute sulphuric acid (F3) from the system for achieving a high concentration of nitric acid by extractive rectification is fed so that, in the second stripping column (K2), the prepurified sulphuric acid from the stripping column (K1) is further purified and is preconcentrated together with the dilute sulphuric acid from the extractive rectification of nitric acid, after which the preconcentrated sulphuric acid flowing out of the evaporator of the second stripping column (K2) being further concentrated in one or more evaporator stage(s) known per se at reduced pressure.

The various preferred further developments and configurations are described in the dependent claims. A system for carrying out such a method, which system comprises the system parts in addition to customary apparatuses and system parts for heating, for heat exchange and for generation of the desired reduced pressure is also described.

The further waste acids are in particular the abovementioned wash acid from the DNT washing and the dilute circulated sulphuric acid (recycled acid) from the stage for the high concentration of azeotropic $HNO_3$ to 98-99% nitric acid.

Below, the invention is explained in more detail with reference to two figures and a working example with mass balances, where neither the figures nor working example are to be understood in the sense of a limiting interpretation of the invention.

DETAILED DESCRIPTION OF PREFERRED EMBODIMENTS

In the figures and the subsequent description, the various abbreviations used represent the following terms:

K represents column, V represents evaporator for achieving a higher concentration at reduced pressure, F represents feed streams, NA represents nitric acid, SA represents sulphuric acid, HD represents superheated steam, ST represents stripping steam and KW represents cool, cold or hot water for the heat exchange with the respective process streams. In the following description of the figures, numbers following K for column identify individual columns explained in more detail in the following description of the figures; numbers following F identify the various feed streams fed into the working-up method according to the invention, in the context of the following description of the figures; and numbers following the abbreviations NA and SA for nitric acid and sulphuric acid, respectively, identify the typical concentrations of these acids in the respective process stream in percent by mass (i.e. SA89 represents, for example, a sulphuric acid having an acid concentration of 89% by mass, NA67 represents an approximately azeotropic nitric acid having an acid concentration of 67% by mass).

Where pressures are stated, specification (a) and (s) in brackets following the statements of pressure in bar denote atmospheric pressure and superatmospheric pressure, respectively.

Figure 1:
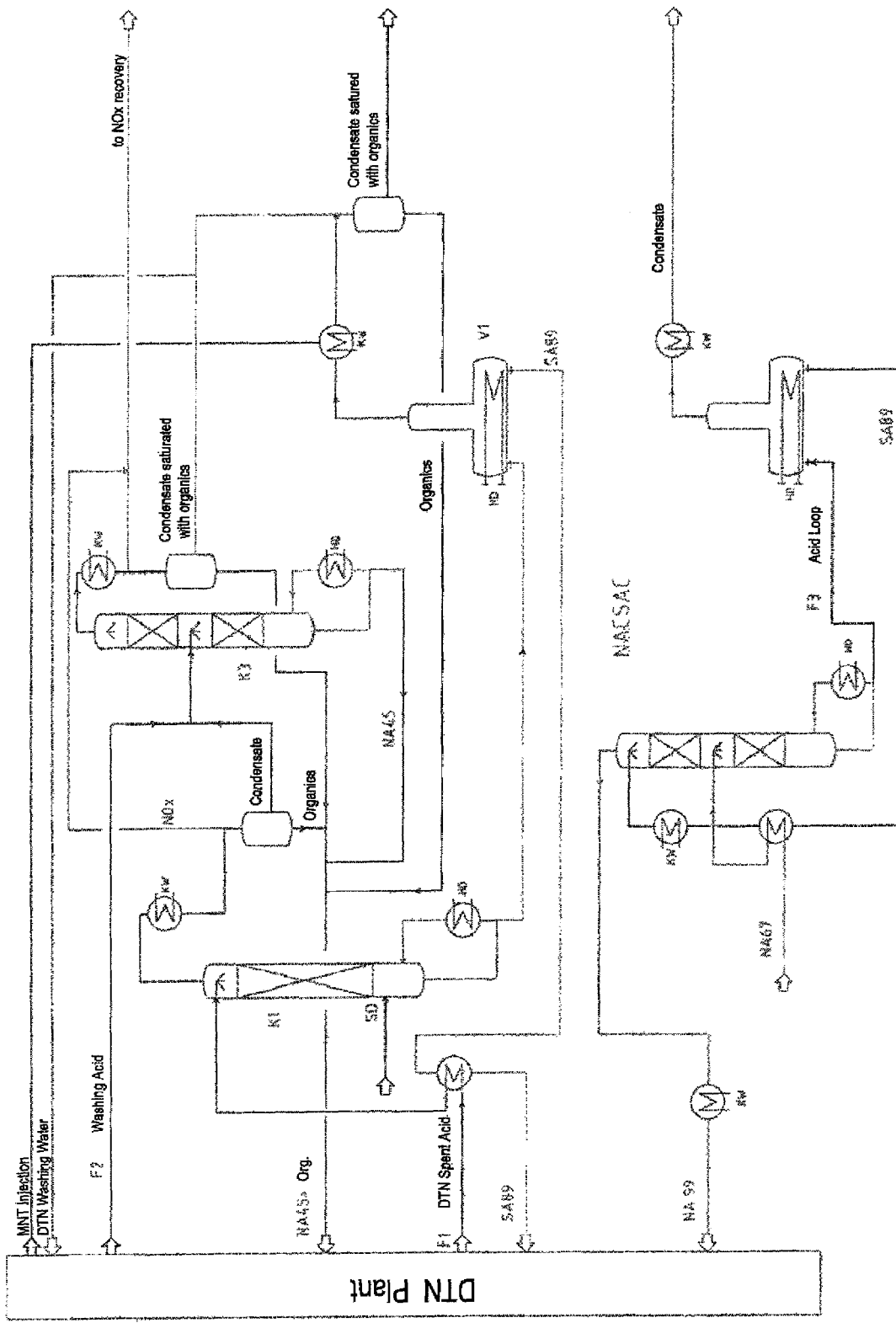
FIG. 1 shows a method flow diagram of the most common prior art comprising a system shown only schematically and known per se for the nitration of toluene and (i) the system branch for the working-up of the waste acid from the nitration and the DNT wash acid, for the recycling of the products recovered in the working-up to the nitration process and for the discharge of the waste products streams from the method, and (ii) the separate system branch for carrying out the NACSAC method for the production of a highly concentrated nitric acid.
Figure 2:
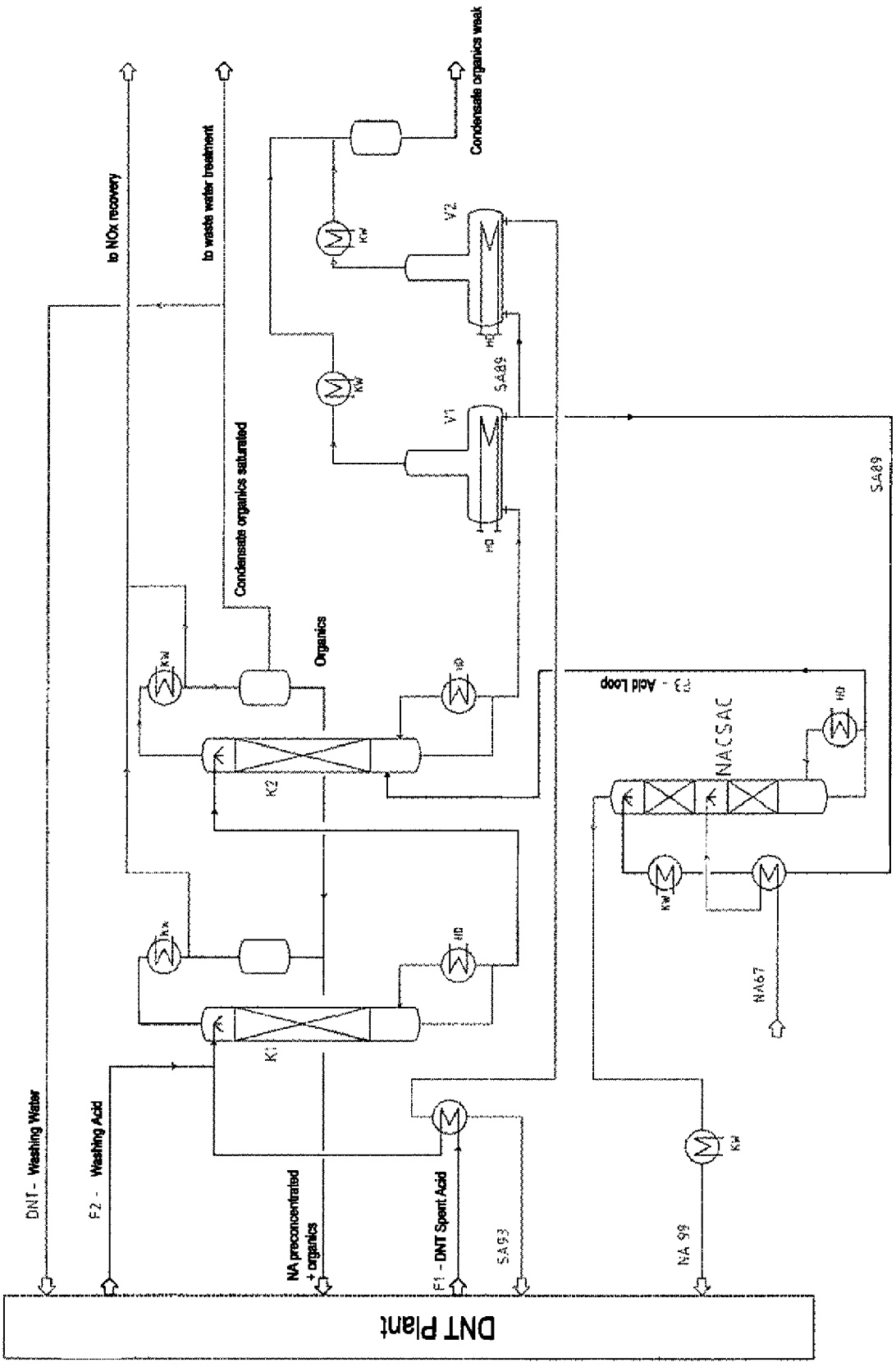
FIG. 2 shows a method flow diagram of a schematically shown system for the nitration of toluene according to a preferred embodiment of a method according to the invention, comprising (i) the system branches for the common working-up of the waste acid from the nitration process and the DNT wash acid and the dilute sulphuric acid from the system branch for carrying out the NACSAC method, for recycling the products recovered in the working-up to the nitration process and for discharging the waste product streams from the method.

In FIGS. 1 and 2, feed streams and product streams corresponding to one another are characterized by corresponding abbreviations, the feed streams in the method according to the prior art (FIG. 1) being designated as F1', F2' and F3', the columns according to the prior art (FIG. 1) as K1' and K3' and an evaporator as evaporator V1', in order to avoid confusion.

FIG. 1 shows a method flow diagram of the most customary prior art with a system for the nitration of toluene, in which toluene is nitrated by any method known per se with formation of DNT, which system is known per se and is shown only schematically. The diagram matches in particular a two-stage nitration process comprising a first stage of the nitration of toluene to give MNT and of subsequent nitration of the MNT to give DNT in a second stage. However, this diagram is not to be understood as being limiting and, with corresponding, routine adaptation of the streams of the method, the method according to the invention can also be used in combination with another nitration method.

The method according to the prior art as shown in FIG. 1 has a stripping column K1', to the top of which the waste acid from the nitration process which is to be worked up (F1'— DNT waste acid) is fed as feed stream 1. In the lower part of the stripping column K1', stripping steam (SD) is fed in as direct steam. After the nitro-organic compounds have been separated off, wash acid (mixed acid) from the DNT washing is added to the vapours obtained as top product, and the combined liquid phases are introduced into an NAPC column K3' for the production of a preconcentrated nitric acid (about 45% by mass) which is recycled, together with the nitro-organic compounds separated off, into the nitration process.

According to FIG. 1, the system branch of the NACSAC method for the production of a highly concentrated nitric acid has no cross connections to the abovementioned system branch for working up the waste acid from the nitration process but does have a separate condensate discharge line.

According to FIG. 2, the two stripping columns K1 and K2 are the core of the inventive solution. The stripping column K1 preferably operates under atmospheric pressure conditions with bottom heating. At the top of the stripping column K1, not only is the feed F1 of the waste acid from the nitration process, preheated above 100° C., added but—mixed therewith or fed in a region in the vicinity of the point where the waste acid from the nitration process is fed in—additionally, as feed stream F2, the DNT wash acid which is obtained from the DNT washing, is to be concentrated and is a dilute mixture of nitric acid, sulphuric acid and nitro-organic compounds. Since the wash acid F2 may have a considerable nitric acid content of up to 20% by mass and is added in a relatively cold state, it is possible in K1, without column reflux, controlled by a defined heat input via the bottom heater of the stripping column K1, to obtain an up to about 50% nitric acid as the top product of K1 after the condensation of the top vapours, which nitric acid can be used directly for the nitration without further working-up and can be discharged. This top product also contains a considerable proportion of nitro-organic compounds, such as MNT and DNT, and only traces of sulphuric acid.

In order to prevent precipitation of solid DNT, which could occur during cooling of the top product of K1 below the setting point of DNT and which could prevent the recycling of the condensed product into the nitration process, the condenser for the vapours obtained as a top product from K1 is expediently operated with hot water at about 55° C. in the feed.

The resulting bottom product of K1, which, as a result of admixing the wash acid feed stream F2, even has a lower sulphuric acid content than the waste acid from the nitration process in feed stream F1, comprises virtually no nitric acid. The content of nitrosylsulphuric acid (NSS, $HNO_2$), too, is reduced by stripping the "thinner solution" with a higher water content to below the desired value, the nitrous gasses ($NO_x$) formed being separated into recovered $HNO_3$ and escaping NO in the condenser for the top product, which condenser is coordinated with K1. The NO can in turn be reacted with water in a known manner in an NOx absorption system under pressure to give nitric acid.

As a result of this procedure according to the invention in stripping column K1, the downstream energy-consumptive NAPC stage (K3 in FIG. 1), which must operate with a column reflux, is superfluous.

However, the prepurified acid flowing out of the bottom of the stripping column K1 still has too high a content of DNT, which would lead to problems in the subsequent concentration stages after its condensation. A second stripping column K2 therefore serves for virtually completely eliminating (<20 ppm) this DNT fraction, likewise by stripping with self-generated steam, in particular without additional foreign stripping steam, for which purpose the sulphuric acid diluted by uptake of water and originating from the NACSAC method for achieving a high concentration of nitric acid is introduced into the bottom of the second stripping column K2. This guarantees that only a DNT fraction which does not exceed 200 ppm and always remains dissolved is present in the vapour condensate of the following stage(s) for achieving a high concentration with the use of horizontal evaporators at a reduced pressure of 100 mbar absolute (mbar a).

By feeding, according to the invention, the DNT-containing exit acid from the stripping column K1 to the top of the second stripping column K2 and introducing the so-called dilute circulating acid F3 from the method for achieving a high concentration of nitric acid (NACSAC) with likewise about 70% by mass of sulphuric acid and traces of DNT into the lower part of the stripping column K2 or directly into the bottom heater of the column K2, sufficient steam is obtained by self-evaporation in order to be able to eliminate virtually the entire remaining DNT from the waste acid from the nitration process, with the required number of plates in column K2 and a defined final concentration of the exit sulphuric acid of this stripper stage. This works particularly well if the second stripping stage in column K2 is operated at a moderately reduced pressure, preferably at 300-500 mbar (a), since, under such conditions, firstly the degree of concentration is higher than at atmospheric pressure and moreover the dew point or boiling point of the aqueous vapour condensate is still above the setting temperature of DNT. Thus, there is no fear of solid precipitates in the heterogeneous top product of K2 at this stage after condensation, in particular if condensation is effected indirectly with cooled hot water circulation.

Owing to the synergistic joint working-up, according to the invention, of different, so far separately processed feed acids, namely the waste acid from the nitration process from F1, the wash acid from the DNT washing from F2 and the circulating acid from F3 from the NACSAC method, the NACSAC process dispenses with the stage for the reconcentration of the sulphuric acid serving as an extracting medium, which stage is otherwise required there.

The aqueous vapour condensate obtained from the stripping column K2 comprises only dissolved DNT and insignificant amounts of nitric acid and sulphuric acid after separation of the DNT phase. It is therefore possible to use at least a part of this condensate again as washed water for the DNT washing.

The bottom product from K2, typically, for example, an about 78-82% sulphuric acid, is then further concentrated in downstream conventional known evaporators V, preferably in horizontal kettle evaporators, of which two evaporators V1 and V2 are shown in FIG. 2, in reduced pressure operation at 100 mbar (a) or lower.

Since a part of the concentrated total sulphuric acid is required again as circulating acid for the extractive distillation in the NACSAC column and must therefore be removed from the process, according to the invention one of these reduced-pressure evaporator stages is designed so that the exit acid therefrom has exactly the sulphuric acid concentration (SA89) which is required for the NACSAC process, so that this portion can be recycled directly to the NACSAC column.

Since a sulphuric acid which has an even higher sulphuric acid concentration than the sulphuric acid used as an extracting medium in the NACSAC process is often required for the nitration, the residual stream of the concentrated sulphuric acid can be even further concentrated separately for the nitration in such a case in a further reduced-pressure evaporator stage V2 at an even further reduced pressure.

The vapour condensate from the reduced-pressure evaporator stages downstream of the two stripping columns K1 in combination with K2 according to the invention has a substantially improved purity owing to the very substantial elimination of the organic compounds in K1 and K2 compared with the condensates of the prior art or the top product of K2 in the method according to the invention and in most cases need not be subjected to an expensive aftertreatment. As a rule, it can be fed directly to a biological waste water plant and need not be routed via thermolysis or extraction.

In the above-described preferred embodiment of the method according to the invention as shown in FIG. 2, the wash acid from the DNT washing is used as feed stream F2 in addition to feed stream F1 comprising the waste acid from the nitration process and feed stream F3 comprising the so-called circulating acid from the stage for highly concentrating nitric acid by extractive rectification. However, the method according to the invention can also be carried out if no wash acid feed stream F2 is available, for example because the nitration process is not a process for the production of DNT or a system for separately working up the wash acid is present which can be further operated under advantageous conditions. In such a case, that proportion of nitric acid and of water which is usually introduced with feed stream F2 in an embodiment of the method according to FIG. 2 would be absent in the stripping column K1. By feeding, for example, the dilute nitric acid which is obtained at the stage of the absorption of the $NO_x$ waste gases to the stripping column K1 instead of the wash acid, the lack of the feed stream F2 can be substantially compensated if the parameters of the method are, if appropriate, correspondingly adapted. For such a procedure, the waste acid from the nitration process should have a content of $HNO_3$ and nitrosylsulphuric acid (as $HNO_2$) of at least 1% by mass in each case, and the feed must not be preheated to such a great extent as in the case of the concomitant use of the DNT wash acid from F2, so that a nitric acid of virtually 50% by mass can be obtained at the top of the stripping column K1.

Of course, it is, if desired, also possible to feed the wash acid from the nitration process completely or partly in combination with another dilute nitric acid, for example from the $NO_x$ absorption, into the stripping column K1 if this has advantages in the specific case, for example with regard to the quality and concentration of that fraction comprising nitric acid and nitro-organic compounds which is obtained as a top product of the stripping column K1 and is recycled directly into the nitration process.

Working Example

The method according to the invention is now explained in more detail with reference to a working example which is to be interpreted as being non-limiting, reference being made to FIG. 2 and the various streams of the method being identified by abbreviations which were explained further above after the general description of the figures.

Steam having a pressure of 17 bar (s) is used as heating steam for all evaporators. The heater surfaces are made of tantalum.

The feed streams F1 to F3 according to FIG. 2, which are worked up together by the method according to the invention, are specified as follows:

F1: Waste acid from the nitration process from the DNT system (fed after preheating to the top of K1)
  Throughput: about 33500 kg/h
  Temperature: about 50° C.
  Composition: Sulphuric acid: about 70.5% by mass
  a. Nitric acid: about 1.0% by mass
  b. $HNO_2$: about 1.3% by mass
  a. (3.5% by mass of NSS)
  c. DNT/MNT about 0.4% by mass
  a. (predominantly DNT)
  d. Water remainder
F2: Wash acid from DNT washing (fed to the top of K1)
  Throughput: about 33200 kg/h
  Temperature: about 60° C.
  Composition: Sulphuric acid: about 9.0% by mass
  a. Nitric acid: about 18.0% by mass
  b. $HNO_2$: about 0.5% by mass
  c. DNT/MNT about 2.0% by mass
  a. (predominantly DNT)
  d. Water remainder
F3: Circulating acid from the NACSAC column (introduced into the bottom of column K2)
  Throughput: about 37750 kg/h
  Temperature: about 166° C.
  Composition: Sulphuric acid: about 71.0% by mass
  a. Nitric acid: about 0.01% by mass
  b. $HNO_2$: traces
  c. DNT/MNT traces
  d. Water remainder The column K1, which is equipped with glass packing for realising the required number of plates, operates at atmospheric pressure. A horizontal evaporator according to the prior art is used as a heater for K1.

About 2260 kg/h of an approx. 48% nitric acid are collected at the top of column K1 as a product of the first working-up after condensation and are recycled directly into the nitration process for DNT production. This top product also contains undissolved liquid DNT.

The bottom product of the stripping column K1 is an approx. 70% by mass sulphuric acid and is fed to the top of the stripping column K2 which is heated by a horizontal evaporator and likewise equipped with a glass packing and which is operated at a system pressure of about 400 mbar (a). The circulating acid (F3) from the NACSAC stage is introduced into the evaporator entrance of the stripping stage. With defined heating, which is regulated via the evaporator exit temperature of the exit acid, about 7375 kg/h of vapours are taken off via the top of column K2 and subsequently condensed. The remaining nitro-organic compounds and residues of nitric acid not already eliminated from the sulphuric acid in K1 and about 0.2% by mass of sulphuric acid (losses) are present in the vapour condensate obtained from K2.

After separation of the DNT from the DNT-containing phase of the vapour condensate from K2, which is recycled together with the nitric acid top product from K1 into the DNT system, an amount of about 2700 kg/h of the aqueous phase of the vapour condensate of K2, which is saturated with organic compounds (about 1200 ppm by mass), is branched off and serves as wash water for the DNT product in the DNT system. The remaining larger part of the aqueous condensate is fed to a waste water treatment system in which the remaining organic compounds are removed, for example a thermolysis.

Collected gaseous $NO_x$ emissions from K1 and K2 are extracted by suction and fed to an NOx destruction system, for example an NOx absorption system, in which an about 50% nitric acid is produced with water under elevated pressure of about 6 bar (a). Said nitric acid can likewise be reused directly in the first stage of a two-stage nitration process. However, according to a variant of the method mentioned below, it can also be fed into the stripping column K1 with the waste acid from the nitration process.

The about 79% sulphuric acid leaving the bottom heater of stripping column K2 and having a residual content of only about 20 ppm by weight of nitro-organic compounds is fed to the next evaporator stage for further sulphuric acid concentration, once again with a horizontal evaporator, which is operated at a reduced pressure of about 100 mbar (a).

The vapours from this stage are precipitated without problems in the connected condenser with cooling water at 30° C. without DNT precipitates occurring. An amount of about 7700 kg/h of a condensate which has a sulphuric acid content of up to 0.8% by mass (losses) but comprises only about 160 ppm by weight of organic compounds is obtained. This stream can be passed without further working-up into a biological waste water plant, which is a major advantage.

About 57000 kg/h of concentrated sulphuric acid having a concentration of about 89% by mass flow out of the evaporator of this abovementioned reduced-pressure stage, of which about 30 t/h are branched off without cooling as sulphuric acid for the extractive distillation in the NACSAC system, where, with its aid, the azeotropic nitric acid used there is concentrated from about 65-67% by mass by water abstraction to 99% by mass of $HNO_3$ (NA99), which is required in the second stage of the DNT production.

The remaining part of the 89% sulphuric acid from the reduced-pressure evaporator stage, which has not been branched off into the NACSAC system as extracting medium, is, if appropriate, further concentrated in a further horizontal evaporator V2 and/or cooled directly in the heat exchanger with the feed of the waste acid from the nitration process (F1) and subsequently with cooling water to 40° C. and provided for the DNT nitration.

What is claimed is:

1. A method for recovering dilute and contaminated waste sulfuric acids from nitration processes, where
the waste acid from the nitration process which is taken off from the nitration process and, in addition to up to 80% by mass of sulfuric acid and water, contains nitric acid, $HNO_3$, nitrosulfuric acid, $HNO_2$ and nitro-organic compounds, namely DNT and MNT, as further constituents being subjected to at least partial purification in a stripping column to remove said further constituents and then being fed to a further concentration stage in one or more downstream evaporators operating at reduced pressure, and
the production of a highly concentrated nitric acid required in the nitration process from a more dilute nitric acid by extractive rectification with the use of concentrated sulfuric acid as an extracting medium also being coordinated with the nitration process, the sulfuric acid used as extracting medium being diluted during the extractive rectification and being reconcentrated for reuse,
wherein the waste acid from the nitration process (F1) is fed to the top of a first, indirectly heated stripping column (K1) and is separated into a top product containing nitric acid and nitro-organic compounds and a prepurified sulfuric acid in the bottom product and
the prepurified sulfuric acid taken off from the bottom of the first stripping column (K1) is being fed to the top of a second further indirectly heated stripping column (K2) which is connected in series and into the bottom region or evaporator of which a dilute sulfuric acid (F3) from the system for achieving a high concentration of nitric acid by extractive rectification is fed so that, in the second stripping column (K2), the prepurified sulfuric acid from the stripping column (K1) is further purified and is preconcentrated together with the dilute sulfuric acid from the extractive rectification of nitric acid, after which the preconcentrated sulfuric acid flowing out of the evaporator of the second stripping column (K2) is being further concentrated in one or more evaporator stage(s) at reduced pressure.

2. The method according to claim 1, wherein the waste acid from the nitration process (F1) is fed to the first stripping column (K1) substantially together with the stream (F2) of a further waste acid from the nitration process in the form of a wash acid from the DNT washing, at the top of the first stripping column.

3. The method according to claim 1, wherein the waste acid from the nitration process (F1) which is to be concentrated has a sulfuric acid content between 68% by mass and 80% by mass and in that the content of nitric acid and the content of nitrosulfuric acid, expressed as $HNO_2$, in the waste acid from the nitration process is in each case at least 1% by mass, and in that the dilute sulfuric acid from the extractive rectification of nitric acid has a content of at least 65% by mass of sulfuric acid.

4. The method according to claim 2, wherein the wash acid contains 10-20% by mass of $HNO_3$ and 5-12% by mass of $H_2SO_4$ and has a total content of 18-35% by mass of mixed acid and contains dissolved nitro-organic compounds.

5. The method according to claim 1, wherein steam at 6 bar (a) to 40 bar (a), or heat transfer oil is used for the indirect heating of the evaporators of the first and second stripping columns (K1 and K2).

6. The method according to claim 5, wherein horizontal evaporators having tantalum heater tubes are used as evaporators for the first and/or second stripping column (K1; K2).

7. The method according to claim 3, wherein the dilute sulfuric acid from the extractive rectification (F3) contains only max. 0.5% by mass of nitric acid and only max. 40 ppm by weight of nitro-organic compounds.

8. The method according to claim 1, wherein the first stripping column (K1) is heated indirectly so that the outflowing sulfuric acid has only a residual content of less than 0.1% by mass of nitric acid and of less than 0.2% by mass of $HNO_2$.

9. The method according to claim 1, wherein the first stripping column (K1) is operated at a system pressure of 500 mbar (a) to 2 bar (a).

10. The method according to claim 1, wherein the second stripping column (K2) is operated at a system pressure of 200 mbar (a) to 1 bar (a).

11. The method according to claim 1, wherein the nitric acid-containing vapor condensate obtained as top product and originating from the first stripping column (K1) is recycled together with the organic phase from a vapor condensate of the second stripping column (K2) directly into the nitration system without phase separation.

12. The method according to claim 1, wherein at least a part of the aqueous phase of the vapor condensate from the second stripping column (K2) is recycled as wash acid for the DNT washing into a nitration system for DNT production.

13. The method according to claim 1, wherein after the preconcentrated sulfuric acid from the second stripping column (K2) has been further concentrated to a higher concentration in at least one evaporator operating at reduced pressure, a part of the more highly concentrated sulfuric acid which corresponds with regard to the sulfuric acid content to the sulfuric acid content in the feed stream from the extractive rectification (F3) is branched off from the total stream and is passed as extracted distillation agent back into the system for achieving a high concentration of azeotropic nitric acid.

14. The method according to claim 1, wherein any aqueous stream having total acid and nitric acid contents which are similar to those in the waste acid from the nitration process is fed to the first stripping column (K1) together with the feed stream of the waste acid from the nitration process (F1).

15. The method according to claim 13, wherein the pure subazeotropic nitric acid with about 20% by mass—50% by mass of $HNO_3$, produced during the NOx absorption, is fed as an aqueous stream having total acid and nitric acid contents which are similar to those in the waste acid from the nitration process.

16. A system for carrying out a method according to claim 1, wherein
a first and a second stripping column (K1; K2) which are provided in each case with bottom heaters and separate condensers, comprise pipelines for feeding two feed streams (F1 and F2) from a nitration system to the top of the first stripping column (K1) and pipelines for feeding a further feed stream (F3) from a system for achieving a high concentration of nitric acid by extractive distillation to the evaporator or bottom part of the second stripping column (K2)

pipelines for recycling at least a part of the condensates from the condensers of the first and second stripping columns (K1, K2) into the nitration system, at least one evaporator connected by a pipeline to the bottom of the second stripping column and operating at reduced pressure, and pipelines for recycling a part of the more highly concentrated sulfuric acid from the at least one evaporator as extracting medium into the system for the production of highly concentrated nitric acid by extractive rectification.

17. The method according to claim 5, wherein the steam is a superheated saturated steam at 15-17 bar (a).

18. The method according to claim 9, wherein the system pressure is at atmospheric pressure.

19. The method according to claim 10, wherein the system pressure at about 400 mbar (a).

* * * * *